Patented June 9, 1931

1,808,849

UNITED STATES PATENT OFFICE

WINFRID HENTRICH AND MAX HARDTMANN, OF WIESDORF-ON-THE-RHINE, JOSEF HILGER, OF COLOGNE-MULHEIM, AND RUDOLF KNOCHE, OF LEVERKUSEN-ON-THE-RHINE, GERMANY, ASSIGNORS TO GENERAL ANILINE WORKS, INC., OF NEW YORK, N. Y., A CORPORATION OF DELAWARE

NEW POLYAZO DYESTUFFS

No Drawing. Application filed November 16, 1928, Serial No. 320,002, and in Germany November 22, 1927.

The present invention relates to new polyazo dyestuffs containing the cyanuric ring, more particularly, it relates to azo dyestuffs of the following general formula:

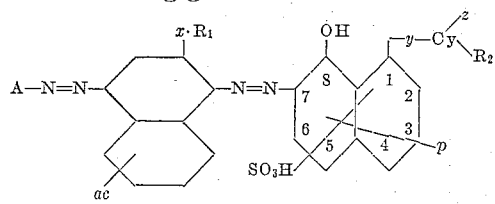

wherein A stands for any initial component, $ac$ stands for hydrogen, a sulfuric acid or carboxylic acid group, $x$ stands for oxygen or sulfur, $R_1$ stands for alkyl or a substituted alkyl, $y$ stands for NH, $NHCO.C_6H_4NH$, $NHCONHC_6H_4NH$ or $y$ and the 1:2-C-atoms of the naphthalene nucleus jointly stand for a heterocyclic ring system containing a heteronuclear amino group which is connected with the cyanuric ring, for instance for the following ring system:—

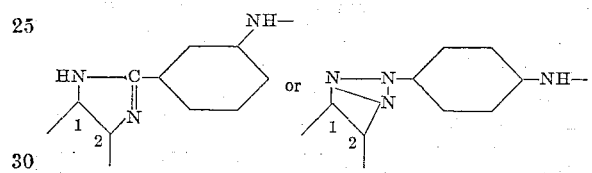

Cy stands for the cyanuric ring, $z$ stands for halogen or any substituent linked with an oxygen, sulfur or nitrogen atom to the cyanuric ring, $R_2$ stands for an amino azo residue and $p$ stands for hydrogen or a sulfonic acid group.

Our new compounds may be prepared by further diazotization of the aminoazo compound of any desired initial component and such a derivative of 1-naphthylamine or a sulfonic acid or a carboxylic acid thereof coupled in the para-position to the amino group, as contains in 2-position of the naphthalene nucleus an alkylated hydroxy group or alkylated mercapto group, for example compounds of the following formula:

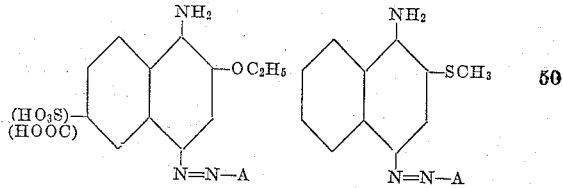

in which A is the desired initial compound, and coupling with a compound of the general formula:

in which Cy represents a cyanuric ring, B stands for a substituted or unsubstituted peri-amino-hydroxy-naphthalene or peri-(amino-benzoylamino)-hydroxy naphthalene or a substitution product or equivalent thereof, in which the linkage —NH—CO— can also be replaced by —NH—CO—NH—, or for a derivative of a peri-amino-hydroxy-naphthalene in which the 1:2-C-atoms of the naphthalene nucleus are members of a heterocyclic ring system with a heteronuclear amino group, for instance for an amino-phenyl-1.2-imidazole-8-hydroxy naphthalene or for an amino-phenyl-1.2-triazole-8-hydroxy-naphthalene, $R_2$ stands for an amino azo compound and $z$ stands for a halogen atom or any desired residue, which is linked to the cyanuric ring by a nitrogen-, oxygen- or sulfur atom.

Dyestuffs of the above type are also obtainable when the introduction of the cyanuric ring is effected into the compounds marked B in the above general formula after the coupling with the above mentioned diazo azo compounds. Moreover the invention is not restricted to the use of such coupling components as contain in the cyanuric ring already produced amino azo compounds (see $R_2$ in the general formula), but coupling compounds can be used in their place, which contain residues, such as the following ones, in the cyanuric ring:

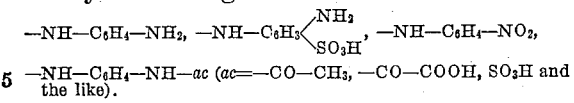

—NH—C₆H₄—NH—ac (ac=—CO—CH₃, —CO—COOH, SO₃H and the like).

The final azo group is then introduced by diazotization and coupling, in substance or on the fiber, if necessary after reduction or saponification.

In accordance with the present invention green polyazo dyestuffs are obtained, which are very fast or light, dye full various green shades and which over all known green direct dyestuffs or developing dyestuffs possess the advantage of extraordinary purity of shade.

Upon reduction with stannous chloride and hydrochloric acid among others a 1.4-diamino naphthalene compound containing in 2-position of the naphthalene nucleus an alkylated hydroxy or mercapto group and a compound of the following formula:

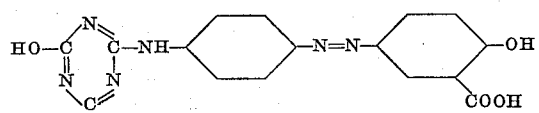

are formed, wherein $y$ stands for NH, NHCO.C₆H₄NH, NHCONHC₆H₄NH, or $y$ and the 1:2-C-atoms of the naphthalene nucleus jointly stand for a heterocyclic ring system containing a heteronuclear amino group which is connected with "Cy," Cy stands for the cyanuric ring, $z$ stands for halogen or any substituent linked with an oxygen, sulfur or nitrogen atom to the cyanuric ring and R₃ stands for the residue of an aromatic diamine, and $p$ stands for H or HSO₃.

The following examples illustrate the principles underlying the invention, without restricting the same thereto:

*Example 1.*—The diazo compound, produced from 479 parts by weight of the amino azo compound from 4-amino-1:3-dimethyl-benzene-6-sulfonic acid and 1-amino-2-naphthol ethylether-6-sulfonic acid, is separated, stirred with ice-water and caused to flow at 5–10° C. into a well stirred solution, advantageously in the presence of pyridine, of 810 parts by weight of the condensation product obtained in any desired sequence from one molecule of cyanuric chloride (cyanuric bromide), one molecule of 1-amino-8-hydroxy-naphthalene-3:6-disulfonic acid, one molecule of 4-amino-4'-hydroxyazo-benzene-3'-carboxylic acid, in which the third chlorine atom of the cyanuric chloride is replaced by hydroxyl. Coupling immediately sets in, accompanied by a deep green coloration of the solution and is soon complete. The dyestuff having in its free state the probable formula:

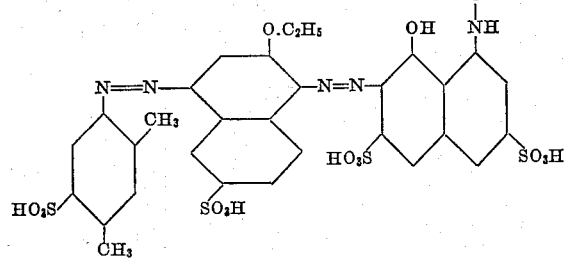

partly separates, the complete separation is effected by salting out, after which the working up takes place in the customary manner. Cotton, for example, is dyed from a Glauber salt-sodium carbonate bath, in powerful, brilliant green shades of very good fastness to light.

Instead of 4-amino-1-3-dimethylbenzene-6-sulfonic acid other amino sulfonic acids of the benzene or naphthalene series can be used, also for example 4-amino-1-methylbenzene-3-sulfonic acid, 4'-methyl-2-amino-1:1'-diphenyl-sulfone-4-sulfonic acid, 4-benzoyl-amino-1-amino-benzene-2-sulfonic acid, the dehydrothiotoluidine disulfonic acid and the like; likewise unsulfonated amines, such as 3-chloro-2-amino-1-methylbenzene and the like are applicable; the 1-amino-2-naphthol ethylether-6-sulfonic acid can be replaced by analogously constituted derivatives of α-naphthylamine, coupling in the para-position to the amino group, for example, also by the 1-amino-2-ethoxynaphthalene-6-carboxylic acid. A certain number of similar compounds is mentioned in applications Ser. No. 203,266, filed July 2nd, 1927 and Ser. No. 288,803, filed June 27th, 1928.

Thus for example, the trisazo dyestuff from 2-aminonaphthalene-8-sulfonic acid, 1-amino-2-naphthol-methyl-ether-6-sulfonic acid and the condensation product used as coupling component in the above example dyes cotton an extraordinarily clear yellowish green shade. Instead of 2-naphthylamine-8-sulfonic acid the amino azo compound of this acid and m-toluidine can also be used. By replacing in the above type of trisazo dyestuffs the 1-amino-2-methoxynaphthalene-6-sulfonic acid, for example, by the 1-amino-2.7-naphthylene-di-β-hydroxy propionic acid:

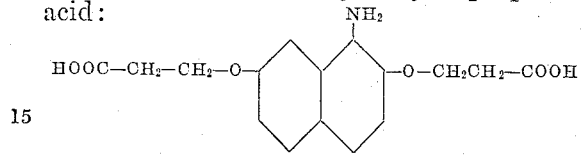

and the condensation product from one molecule of cyanuric halide, one molecule of 1-amino-8-hydroxynaphthalene-3:6-disulfonic acid, one molecule of 4-amino-4'-hydroxyazobenzene-3'-carboxylic acid, in which the third halogen atom of the cyanuric halide is replaced by hydroxyl by the condensation product of the formula:

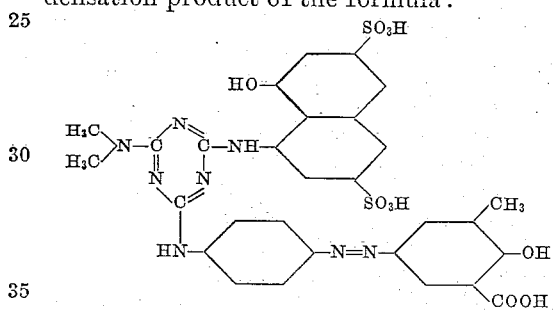

which can be obtained, for example, from the condensation product from molecular quantities of cyanuric chloride, 1-amino-8-hydroxynaphthalene-3:6-disulfonic acid, 4-amino-5'-methyl-4'-hydroxyazobenzene-3'-carboxylic acid by boiling with an excess of dimethylamine solution, an unusually clear green direct dyestuff is likewise obtained, which dyes cotton well. The condensation product produced from molecular quantities of cyanuric chloride, 1-amino-8-hydroxynaphthalene-3:6-disulfonic acid, 4-amino-4'-hydroxyazobenzene-3'-carboxylic acid and aniline, described in the German Patent No. 436,179, example 13 can obviously also be employed.

Furthermore by coupling the diazo azo compound obtained from 4-amino-2-sulfoxanilic acid and 1-amino-2-ethoxynaphthalene, possessing the formula:—

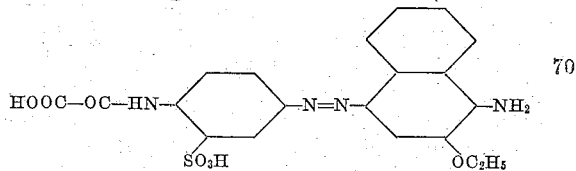

with the condensation product from one molecule of cyanuric chloride, one molecule of 1-amino-8-hydroxynaphthalene-3:6-disulfonic acid, one molecule of 4-amino-4'-hydroxyazobenzene-3'-carboxylic acid and one molecule of ammonia and splitting off the oxalyl residue from the resulting dyestuff by boiling for half an hour with 10% caustic soda solution, an amino trisazo dyestuff is obtained which dyes cotton a very pure, yellowish green shade from a sodium sulfate-sodium carbonate bath; by diazotizing on the fiber and developing with β-naphthol a green shade is obtained, which is fast to washing and light. A similar and more yellow dyestuff is produced by replacing the 1-amino-2-ethoxy-naphthalene by 1-amino-2-methylmercaptonaphthalene:—

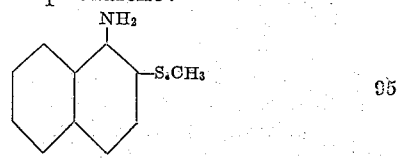

*Example 2.*—The diazo azo compound produced in the known manner from 524 parts by weight of the azo dyestuff from 4-aminoacetanilido-3-sulfonic acid and 1-amino-2-hydroxynaphthalene oxethylether sulfuric acid ester:—

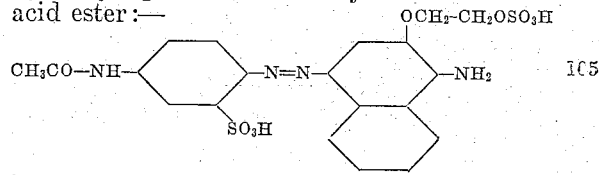

is coupled according to the directions of Example 1 with 935 parts by weight of the condensation product from one molecule of cyanuric chloride, one molecule of 1-ethylamino-8-hydroxynaphthalene-3:6-disulfonic acid, one molecule of 4-amino-4'-hydroxyazobenzene-2:3'-dicarboxylic acid and one molecule of 4-methyl-1-thiophenol. The resulting product having in its free state the probable formula:

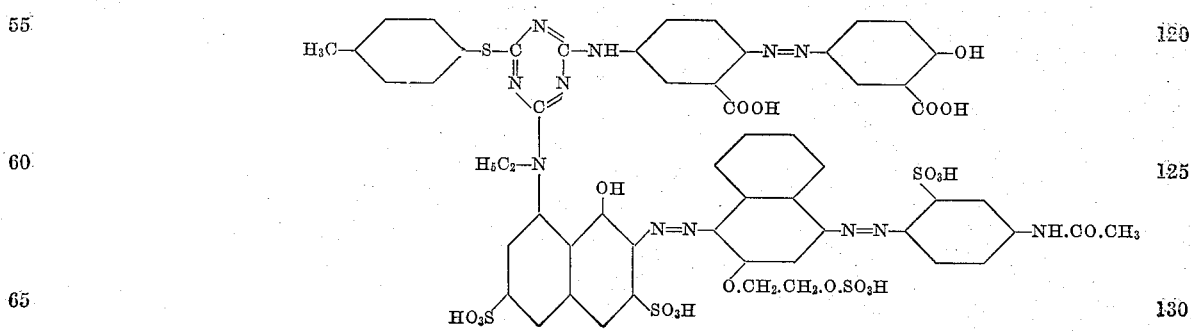

yields a remarkably pure powerful green, fast to light.

By using the diazo azo compound from 2:5-dichloro-1-amino-benzene-4-sulfonic acid and 1-amino-2-ethoxynaphthalene-6-sulfonic acid and coupling with the condensation product from molecular quantities of cyanuric chloride, 1-(4'-aminobenzoyl)-amino-8-hydroxynaphthalene-3:6-(or 4:6)-disulfonic acid, 4-amino-4'-hydroxyazobenzene-3'-carboxylic acid and 4-aminobenzoic acid (or 5-amino-2-hydroxybenzoic acid or also 1-aminobenzene-4-sulfonic acid) very clear, yellowish green dyestuffs are obtained. The shade will become somewhat bluer if in the above cyanuric chloride condensation product the 1-(4'-aminobenzoylamino)-8-hydroxynaphthalene-3:6-disulfonic acid is replaced by the 1-(4'-aminophenylurea)-8-hydroxynaphthalene-3:6-disulfonic acid.

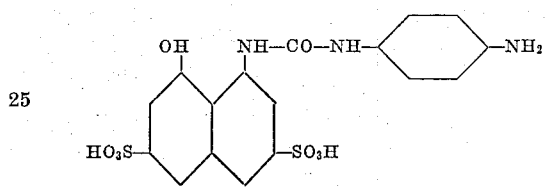

In an analogous manner it is also possible to use compounds, in which a heterocyclic ring is linked in the 1:2-position to the naphthalene nucleus of the peri-amino naphthol sulfonic acids, which carry a heteronuclear amino group. Such compounds are, for example, the 3'-amino-phenyl-1.2-naphthimidazol-8-hydroxy-3.6-disulfonic acid (see German Patent No. 193,350) and the 4'-aminophenyl-1.2-naphtho-triazole-8-hydroxy-3.6-disulfonic acid (see German Patent No. 146,375). It is likewise possible to introduce other heterocyclic rings and peri-amino naphthol sulfonic acids as well as compounds, containing diazotizable amino groups, of the above employed 1-(aminobenzoylamino-8-hydroxynaphthalenes, such as, for example:

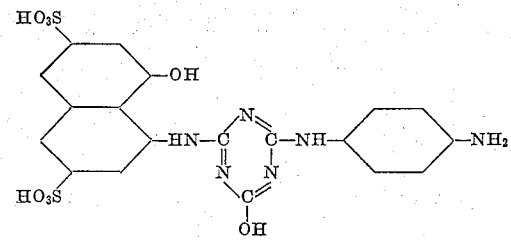

Dyestuffs of this type can moreover also be produced in other ways:—

For example, the further diazotizable amino azo compound from 1-aminobenzene-2:5-disulfonic acid and 1-amino-2-ethoxynaphthalene-6-sulfonic acid is first coupled with 1-(4'-aminobenzoylamino)-8-hydroxynaphthalene-3:6-disulfonic acid, then molecular quantities of the resulting (purified) dyestuff are condensed with cyanuric chloride in aqueous suspension at 20 to 30° C., further condensed at 45–50° C. with 4-amino-4'-hydroxyazobenzene-3'-carboxylic acid and finally boiled with ammonia.

*Example 3.*—The diazo azo compound from 465 parts by weight of the azo dyestuff from 4-amino-1-methylbenzene-3-sulfonic acid and 1-amino-2-ethoxynaphthalene-6-sulfonic acid is coupled with 646 parts by weight of the condensation product from molecular quantities of cyanuric chloride, 1-amino-8-hydroxynaphthalene-6-sulfonic acid, 4-amino-4'-hydroxyazobenzene-3'-carboxylic acid and ammonia. The new dyestuff has in its free state probably the following formula:

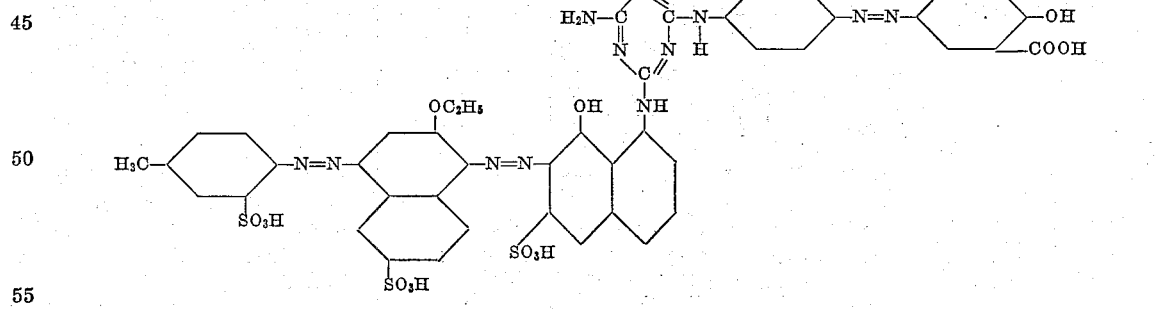

Cotton is dyed by the dyestuff in pure green shades from a Glauber salt sodium carbonate bath.

Green dyestuffs of the same purity of shade are obtained by combining the condensation product of the formula:

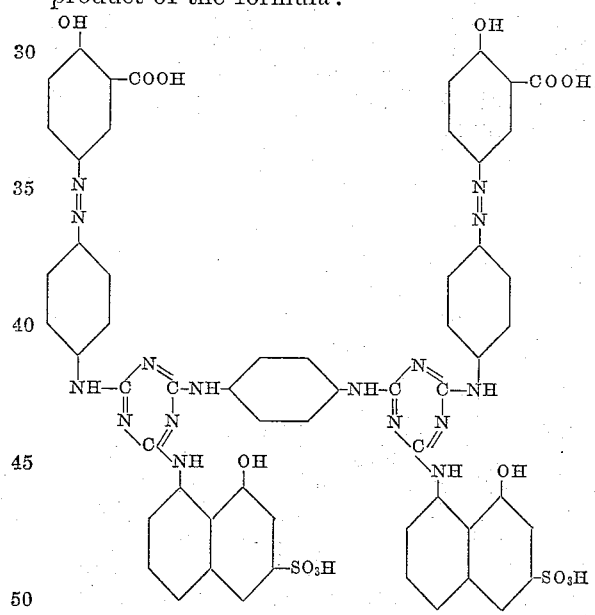

with two molecules of the diazo azo compound from 1-aminobenzene-2:5-sulfocarboxylic acid and 1-amino-2-ethoxy-naphthalene-6-sulfonic acid. The 1-amino-8-hydroxy-naphthalene-6-sulfonic acid can be replaced by 1-amino-8-hydroxynaphthalene-5-sulfonic acid.

*Example 4.*—930 parts by weight of the amino azo compound from 4-amino-1-methyl-benzene-3-sulfonic acid and 1-amino-2-ethoxy-naphthalene-6-sulfonic acid are further diazotized and coupled, as in Example 1, with 971 parts by weight of the condensation product obtained in any desired sequence from one molecule of cyanuric chloride, two molecules of 1-amino-8-hydroxy-naphthalene-3:6-disulfonic acid and one molecule of 4-amino-4'-hydroxy-azobenzene-3'-carboxylic acid. The new dyestuff having in its free state the probable formula:

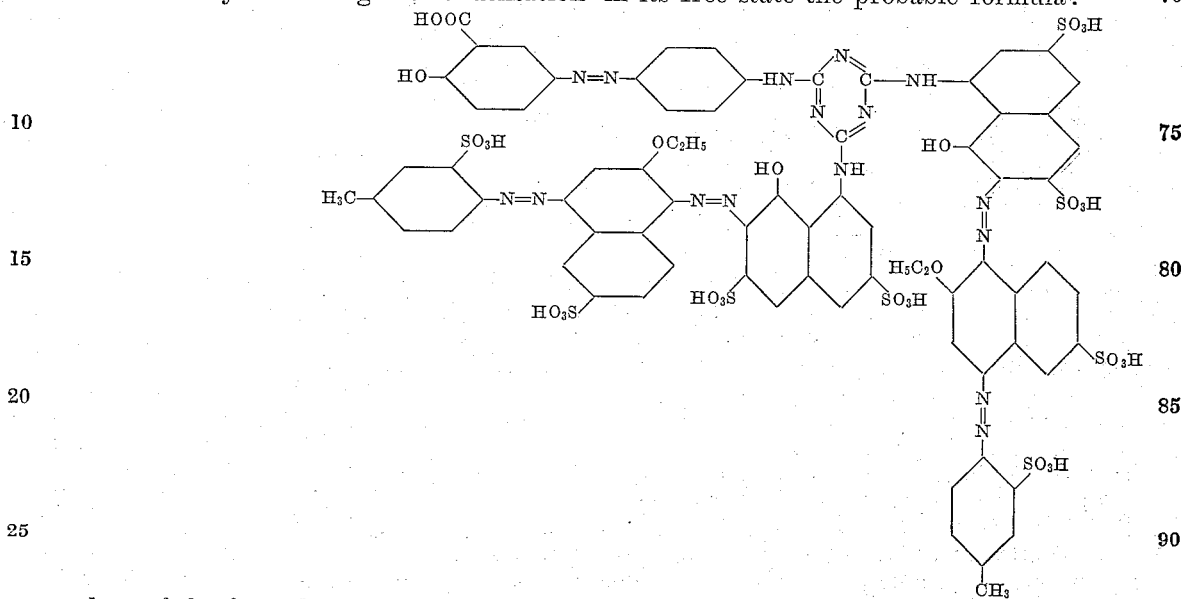

gives on cotton a very clear green shade, for example from a Glauber salt sodium carbonate bath. A pure yellowish green is obtained when the further diazotized amino azo compound from 4-ethoxy-1-aminobenzene-2-sulfonic acid and 1-amino-2-ethoxy-naphthalene-6-sulfonic acid is combined with the condensation product from one molecule of cyanuric chloride, one molecule of 1-amino-8-hydroxynaphthalene-3:6-disulfonic acid and two molecules of 4-amino-4'-hydroxy-azobenzene-3'-carboxylic acid.

*Example 5.*—471 parts by weight of the aminoazo compound:

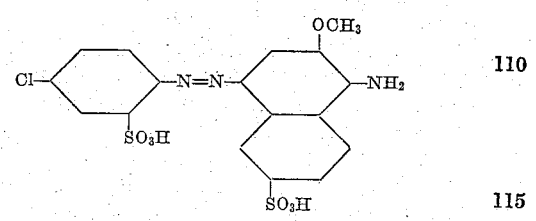

are diazotized indirectly. The diazo compound is salted out, made into a paste with ice-water and coupled, advantageously in the presence of pyridine or much ammonia, at 0° C. with 635 parts by weight of the condensation product from one molecule of cyanuric chloride, one molecule of 2-nitro-4-amino-1-methylbenzene and one molecule of dimethylamine. The blue azo dyestuff is salted out and again dissolved, the nitro group is reduced in the presence of a little ammonia with an aqueous solution of 357 parts by weight of crystallized pure sodium sulfide. The resulting purified dyestuff of the formula:

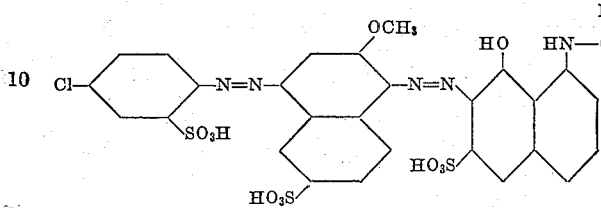
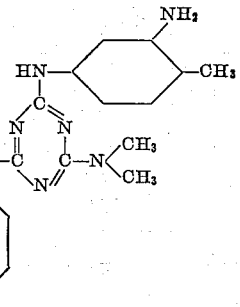

can also be built up in the following way:—

The diazotized aminoazo compound from 4-chloro-1-aminobenzene-2-sulfonic acid and 1-amino-2-methoxynaphthalene-6-sulfonic acid is combined with the condensation product from one molecule of cyanuric chloride, one molecule of 1-amino-8-hydroxynaphthalene-6-sulfonic acid, one molecule of 2:4-diamino-1-methylbenzene and one molecule of dimethylamine.

Quite similar dyestuffs are produced, when instead of the above condensation product that from one molecule of cyanuric chloride, one molecule of 3-amino-formanilide (or 3-amino-acetanilide, 3-aminophenyl oxaminic acid, 3-aminophenyl sulfaminic acid and the like) and one molecule of dimethylaniline is employed, and in the resulting disazo dyestuff the acyl residue is removed, say by boiling for about half an hour with a 10% caustic soda solution, or in the case of 3-aminophenyl sulfamic acid by saponification in an acid medium, or simply by further diazotization. Obviously in the type of cyanuric chloride condensation products here used the heteronuclear amino group can be introduced by reduction of a nitro group or saponification of an acyl group and then coupling can be effected with the diazo compound.

By further diazotizing the amino disazo dyestuff of the above formula, obtainable according to one of the several processes (it will be advantageous to work with a fairly dilute solution and at about 30° C.) and coupling the separated diazo disazo compound with 1-(2'-carboxyphenyl)-3-methyl-5-pyrazolone in sodium carbonate solution a dyestuff having in its free state the probable formula:

is obtained which dyes cotton a pure yellowish green shade. By replacing the 1-(2'-carboxyphenyl)-3-methyl-5-pyrazolone by the sulfonic acid of acetoacetyl-2-anisidine, a clear and more bluish green shade is obtained, which is fast to light. Furthermore by diazotizing on the fiber the amino disazo dyestuffs of the above formula and coupling with methyl phenyl pyrazolone, a very clear yellowish green results, which is fast to washing and light. Finally, by coupling the diazotized aminoazo dyestuff from 4-chloro-1-aminobenzene-2-sulfonic acid and 1-amino-2-methoxynaphthalene-6-sulfonic acid with the condensation product from molecular quantities of cyanuric chloride, 1-amino-8-hydroxynaphthalene-6-sulfonic acid, 4-amino-1-methylbenzene-2-azo-1'-(2''-carboxy-5''-sulfo)-phenyl-3'-methyl-5'-pyrazolone of the formula:

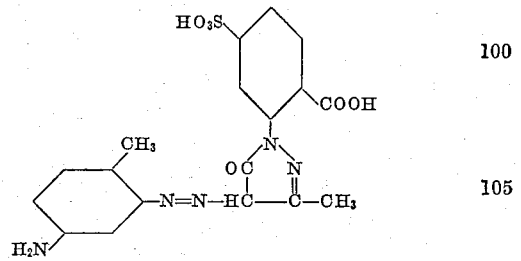

and dimethylamine, a product analogous to the above described trisazo dyestuff is obtained, which can also be produced by combining the diazotized aminoazo dyestuff from 4-chloro-1-amino-benzene-2-sulfonic acid and 1-amino-2-methoxynaphtralene-6-sulfonic acid with the diazotized condensation product from one molecule of cyanuric chloride, one molecule of 2:4-diamino-1-methylbenzene and one molecule of dimethyl-amine and coupled with 1-(2'-carboxy-5'-sulfo)-phenyl-3-

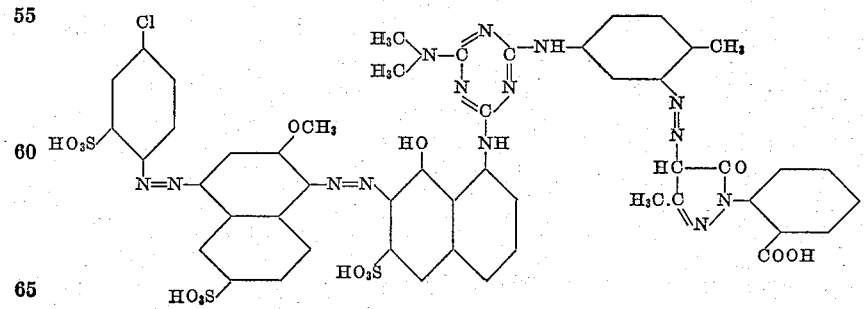

methyl-5-pyrazolone (advantageously in the presence of sodium acetate).

Valuable green dyestuffs of the same type are also produced by combining the diazo-azo compound from 4-chloro-1-aminobenzene-2-sulfonic acid or similar compounds and 1-amino-2-methoxy-naphthalene-6-sulfonic acid or equivalents thereof, such as are described in the co-pending application Ser. No. 203,266, filed July 2nd, 1927, with the condensation products from molecular quantities of cyanuric chloride, and amino hydroxynaphthalene sulfonic acid, 1:3-phenylenediamine-4-sulfonic acid or 1:4-phenylenediamine-3-sulfonic acid and dimethylamine or other desired compounds, possessing reactive hydrogen atoms attached to the nitrogen-, oxygen or sulfur atom, finally diazotizing in substance or on the fiber and coupling with methyl ketol, its analogues and substitution products, pyrazolones or derivatives of the β-ketone aldehyde or 1:3-dihydroxyquinolines or sulfazones. Furthermore, clear yellowish green azo dyestuffs are obtained by further diazotizing, for example, the aminoazo compound from 4-chloro-1-aminobenzene-2-sulfonic acid and 1-amino-2-methoxy-naphthalene-6-sulfonic acid and coupling with the saponified condensation product from one molecule of cyanuric chloride, one molecule of 1-amino-8-hydroxynaphthalene-3:6-disulfonic acid and two molecules of 3-amino-formanilide, then tetrazotizing in substance or on the fiber and coupling with pyrazolone, derivatives of β-ketone aldehyde, methyl ketol or the like.

We claim:

1. As new products polyazo dyestuffs of the probable general formula:

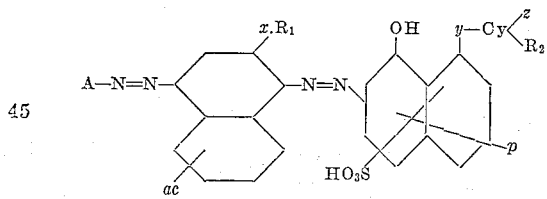

wherein A stands for any initial component, ac stands for hydrogen, a sulfuric acid or carboxylic acid group, x stands for oxygen or sulfur, $R_1$ stands for alkyl, y stands for a substituent of the group consisting of —NH—, 'NHCO—$C_6H_4$NH—,
    —NHCONH$C_6H_4$NH—
or y and the 1:2-C-atoms of the naphthalene nucleus jointly stand for a heterocyclic ring system containing a heteronuclear amino group, p stands for H or a sulfonic acid group, Cy stands for the cyanuric ring, z stands for halogen or any substituent linked with an oxygen, sulfur or nitrogen atom to the cyanuric ring, and $R_2$ stands for an amino azo residue, dyeing various green shades fast to light and yielding upon reduction with stannous chloride and hydrochloric acid among others a 1.4-naphthalene diamine compound containing in 2-position an alkylated hydroxy or mercapto group and a compound of the general formula:

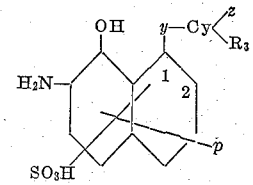

wherein y stands for NH, NHCO.$C_6H_4$NH, NHCONH$C_6H_4$NH, or y and the 1:2-C-atoms of the naphthalene nucleus jointly stand for a heterocyclic ring system containing a heteronuclear amino group, Cy stands for the cyanuric ring, z stands for halogen or any substituent linked with an oxygen, sulfur or nitrogen atom to the cyanuric ring, $R_3$ stands for the residue of an aromatic diamine and p stands for H or a sulfonic acid group.

2. As new products polyazo dyestuffs of the probable general formula:

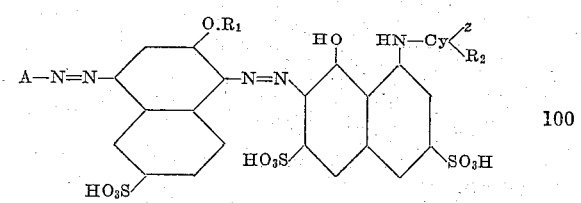

wherein A stands for any initial component, $R_1$ stands for alkyl, Cy stands for a cyanuric ring and z stands for any substituent linked with an oxygen, sulfur or nitrogen atom to the cyanuric ring and $R_2$ stands for an amino azo residue, dyeing various green shades fast to light and yielding upon reduction with stannous chloride and hydrochloric acid among others a 1.4-naphthalene diamine sulfonic acid containing in 2-position an alkylated hydroxy group and a compound of the general formula:

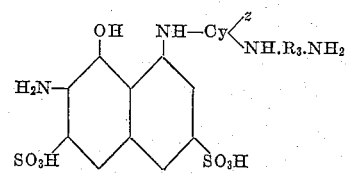

wherein Cy stands for the cyanuric ring, z stands for halogen or any substituent linked with an oxygen, sulfur or nitrogen atom to the cyanuric ring and $R_3$ stands for an aromatic nucleus.

3. As a new product the polyazo dyestuff of the probable formula:

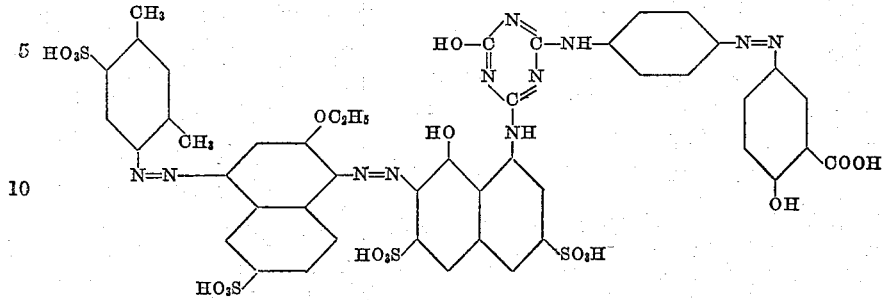

dyeing cotton from a Glauber salt-sodium carbonate bath brilliant green shades of very good fastness to light and yielding upon reduction with stannous chloride and hydrochloric acid one molecule of 1-3-dimethyl-4-aminobenzene-6-sulfonic acid, one molecule of 1.4-diamino-2-ethoxy-naphthalene-6-sulfonic acid, one molecule of the compound of the following formula:

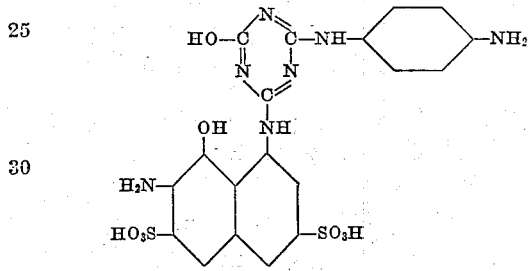

and one molecule of 1-amino-4-hydroxy-benzene-3-carboxylic acid.

In testimony whereof we have hereunto set our hands.

WINFRID HENTRICH. [L. S.]
MAX HARDTMANN. [L. S.]
JOS. HILGER. [L. S.]
RUDOLF KNOCHE. [L. S.]